(12) United States Patent
Lee et al.

(10) Patent No.: US 12,282,991 B2
(45) Date of Patent: Apr. 22, 2025

(54) METHOD AND APPARATUS FOR CONTROLLING AVATAR

(71) Applicant: KT&G CORPORATION, Daejeon (KR)

(72) Inventors: Junhui Lee, Daejeon (KR); Byeongyong Ahn, Daejeon (KR); So Hee Yoo, Daejeon (KR); Seonbong Lee, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 18/021,898

(22) PCT Filed: Dec. 8, 2022

(86) PCT No.: PCT/KR2022/019863
§ 371 (c)(1),
(2) Date: Feb. 17, 2023

(87) PCT Pub. No.: WO2023/113369
PCT Pub. Date: Jun. 22, 2023

(65) Prior Publication Data
US 2024/0265614 A1    Aug. 8, 2024

(30) Foreign Application Priority Data
Dec. 16, 2021   (KR) .................. 10-2021-0180396

(51) Int. Cl.
| G06T 13/60 | (2011.01) |
| A24F 40/50 | (2020.01) |
| A24F 40/60 | (2020.01) |
| G06T 13/40 | (2011.01) |

(52) U.S. Cl.
CPC .............. *G06T 13/60* (2013.01); *A24F 40/50* (2020.01); *A24F 40/60* (2020.01); *G06T 13/40* (2013.01)

(58) Field of Classification Search
None
See application file for complete search history.

(56) References Cited

U.S. PATENT DOCUMENTS

| 2008/0301556 | A1* | 12/2008 | Williams | ................ G06T 13/40 715/706 |
| 2010/0286940 | A1* | 11/2010 | Dohta | ................... A63F 13/428 702/92 |
| 2022/0172435 | A1* | 6/2022 | Itabashi | ................. H04L 67/12 |

FOREIGN PATENT DOCUMENTS

| JP | 2008-293401 A | 12/2008 |
| JP | 2018-187305 A | 11/2018 |
| JP | 2018-534004 A | 11/2018 |
| JP | 2019-508026 A | 3/2019 |

(Continued)

OTHER PUBLICATIONS

International Search Report issued Mar. 15, 2023 in Application No. PCT/KR2022/019863.

(Continued)

*Primary Examiner* — Yanna Wu
(74) *Attorney, Agent, or Firm* — Sughrue Mion, PLLC

(57) ABSTRACT

According to an example, to control an avatar, sensing information sensed based on one or more sensors in an additional device connected to an electronic device is received from the additional device, a target action of an avatar generated in advance is determined based on the sensing information, and the avatar is controlled to represent the target action.

11 Claims, 14 Drawing Sheets

(56) References Cited

FOREIGN PATENT DOCUMENTS

| | | |
|---|---|---|
| KR | 10-1671900 B1 | 11/2016 |
| KR | 10-2018-0094068 A | 8/2018 |
| KR | 10-2020-0107395 A | 9/2020 |
| WO | 2020/183655 A1 | 9/2020 |
| WO | 2021/033259 A1 | 2/2021 |

OTHER PUBLICATIONS

Office Action issued Mar. 5, 2024 in Japanese Application No. 2023-512065.

\* cited by examiner

METHOD AND APPARATUS FOR CONTROLLING AVATAR

TECHNICAL FIELD

The following embodiments relate to a technique for controlling an avatar in a virtual space and, more specifically, to a technique for controlling an avatar based on sensing information of an electronic device.

BACKGROUND ART

The demand for electronic cigarettes, or e-cigarettes, has recently been on the rise. The rising demand for e-cigarettes has accelerated the continued development of e-cigarette-related functions. The e-cigarette-related functions may include, in particular, functions according to the types and characteristics of e-cigarettes.

DISCLOSURE OF THE INVENTION

Technical Goals

An embodiment may provide a method of controlling an avatar performed by an electronic device.

An embodiment may provide an electronic device for controlling an avatar.

Technical Solutions

According to an embodiment, a method of controlling an avatar, performed by an electronic device, includes generating an avatar to be associated with a user of the electronic device, receiving, from an additional device connected to the electronic device, sensing information generated based on one or more sensors in the additional device, determining a target action of the avatar based on the sensing information, and controlling the avatar to represent the target action.

The generating of the avatar may include determining a basic appearance of the avatar based on user information about the user, and generating the avatar to represent the basic appearance visually.

The determining of the action of the avatar may include determining the target action of the avatar to be an action of holding a cigarette in a hand, when the sensing information indicates the additional device is powered on.

The determining of the action of the avatar may include determining the target action of the avatar to be an action of lighting a cigarette, when the sensing information indicates a heater of the additional device is being preheated.

The determining of the action of the avatar may include determining, when the sensing information indicates pose information of the additional device, the target action of the avatar to correspond to the pose information.

The determining of the action of the avatar may include determining, when the sensing information indicates inhalation information related to inhalation of the user through the additional device, the target action to correspond to the inhalation information.

The determining of the action of the avatar may include determining an amount of inhalation based on inhalation information related to inhalation of the user through the additional device, and determining the target action of the avatar to be an action of blowing smoke based on the amount of inhalation, when it is determined the user takes the additional device off from his or her mouth.

The amount of inhalation may be calculated based on an average flow velocity of an airflow according to an inhalation of the user, a cross-sectional area of a channel through which the airflow passes, and a duration of an inhalation resistance.

The determining of the action of the avatar may further include determining at least one of an amount, a color, or an effect of the smoke.

The determining of the action of the avatar may include determining the target action of the avatar to be an action of putting out or throwing out a cigarette, when the sensing information indicates the additional device is powered off.

The method may further include placing the avatar in a target virtual space where a plurality of avatars can be placed simultaneously, when the additional device is powered on.

The plurality of avatars may be able to interact within the target virtual space.

The method may further include receiving information about an interaction performed by a target avatar among the plurality of avatars to the avatar from a server that provides the target virtual space, and controlling the additional device based on the information about the interaction.

According to an embodiment, an electronic device includes a memory configured to store a program for controlling an avatar, and a processor configured to execute the program, wherein the processor may be configured to generate an avatar to be associated with a user of the electronic device, receive, from an additional device connected to the electronic device, sensing information generated based on one or more sensors in the additional device, determine a target action of the avatar based on the sensing information, and control the avatar to represent the target action.

Effects

It is possible to provide a method of controlling an avatar performed by an electronic device.

It is possible to provide an electronic device for controlling an avatar.

BEST MODE FOR CARRYING OUT THE INVENTION

Figure 1:
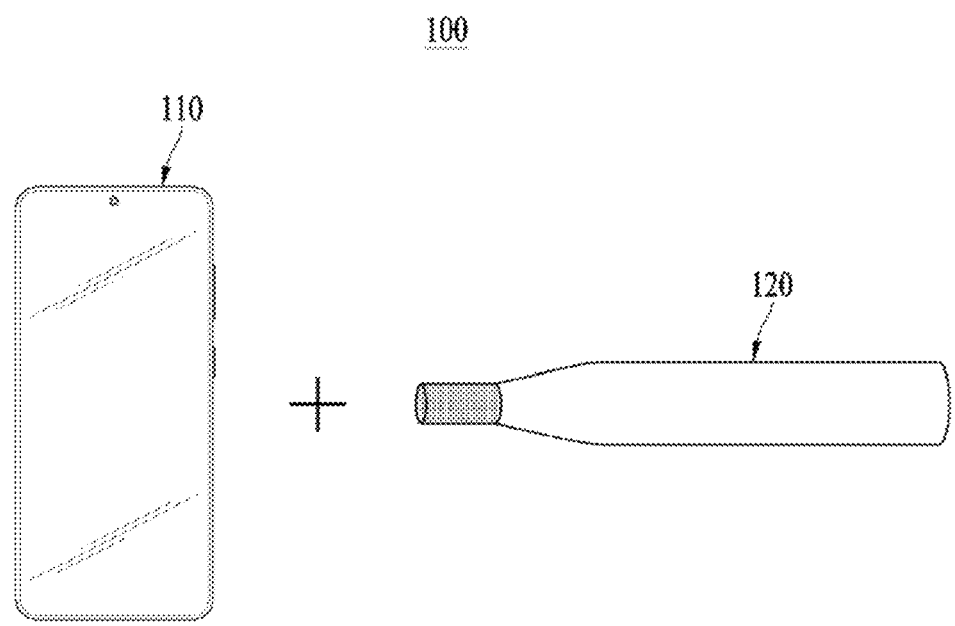
FIG. 1 illustrates a system for managing smoking information according to an embodiment.

The following detailed structural or functional description is provided as an example only and various alterations and modifications may be made to the examples. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 illustrates a system for managing smoking information according to an embodiment.

According to an embodiment, a system 100 for managing smoking information may include a user terminal 110 and an aerosol generating device 120. Each of the user terminal 110 and the aerosol generating device 120 may be an electronic device.

For example, the user terminal 110 may be a mobile communication terminal. The configuration of the user terminal 100 will be described in detail with reference to FIG. 9.

For example, the aerosol generating device 120 may be referred to as an electronic cigarette device or a smoking stick. The aerosol generating device 120 will be described in detail below with reference to FIGS. 2 to 8.

A user may smoke as being provided with an aerosol generated by the aerosol generating device 120. For example, the aerosol generating device 120 may generate an aerosol by heating a cigarette inserted into the aerosol generating device 120. As another example, the aerosol generating device 120 may generate an aerosol using a material in a liquid-type cartridge or a replaceable cartridge in the aerosol generating device 120. The method by which the aerosol generating device 120 generates an aerosol is not limited to the embodiments described above.

According to an embodiment, the aerosol generating device 120 may generate sensing information related to a state of the aerosol generating device 120 using various sensors included in the aerosol generating device 120, and transmit the sensing information to the user terminal 110. The user terminal 110 may control an action of an avatar in a virtual space based on the received sensing information so that the avatar may mimic an action of an actual user. For example, the movements of the arms of the avatar may be controlled based on pose information of the aerosol generating device 120. As another example, the avatar may be controlled to mimic an action of smoking based on inhalation information and exhalation information of the aerosol generating device 120.

According to an embodiment, since avatars may be placed in a virtual space, avatars of users may be placed in the same virtual space regardless of the physical distances between the users. The users may interact with each other through the avatars. For example, the users may exchange information through conversations and chats through the avatars. As another example, the users may use the same content (e.g., an avatar game) through the avatars. A method of controlling an avatar will be described in detail below with reference to FIGS. 10 through 14.

Figure 2:
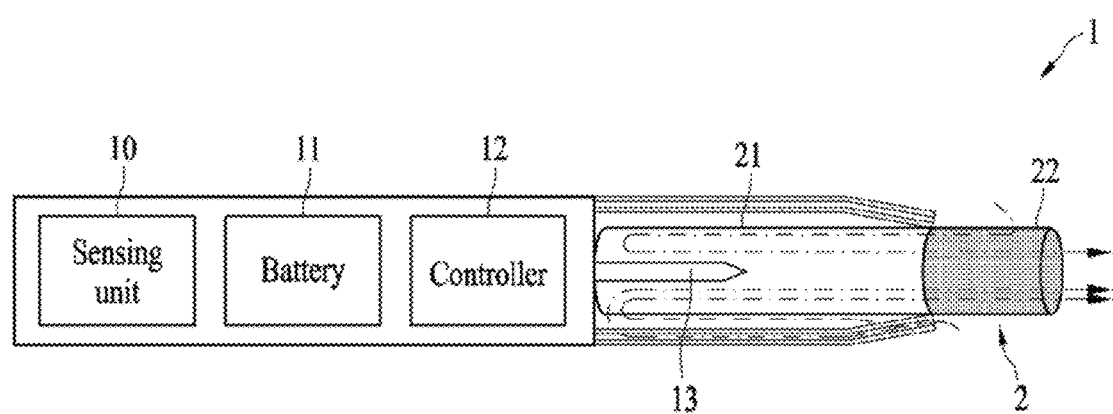
FIGS. 2 to 4 are diagrams illustrating examples of a cigarette inserted into an aerosol generating device according to an example.
Figure 3:
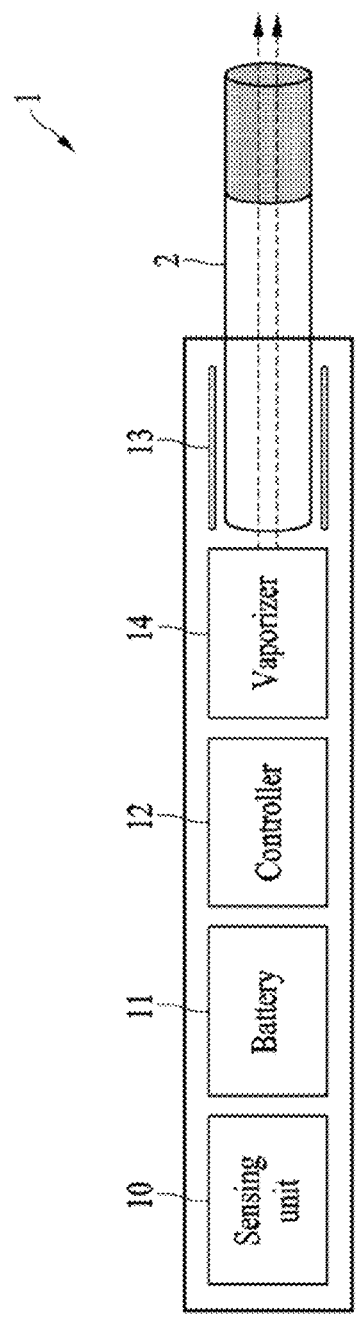
Figure 4:
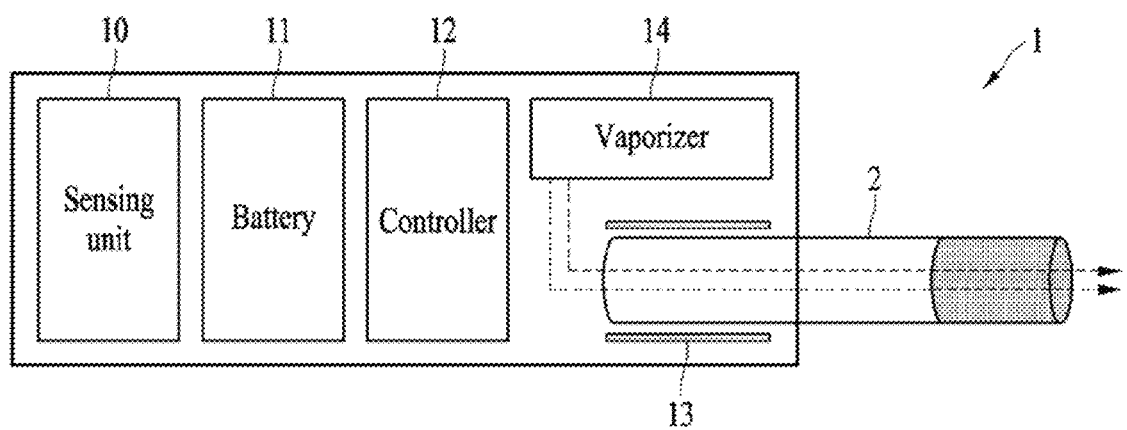

FIGS. 2 to 4 are diagrams illustrating examples of a cigarette inserted into an aerosol generating device according to an example.

Referring to FIG. 2, an aerosol generating device 1 may include a sensing unit 10, a battery 11, a controller 12, and a heater 13. Referring to FIGS. 3 and 4, the aerosol generating device 1 may further include a vaporizer 14. Further, a cigarette 2 may be inserted into an inner space of the aerosol generating device 1. The aerosol generating device 1 may be the aerosol generating device 120 described above with reference to FIG. 1.

According to an embodiment, the aerosol generating device 1 may further include a display.

The aerosol generating device 1 shown in FIGS. 2 to 4 may include components related to the embodiments described herein. Therefore, it is to be understood by those having ordinary skill in the art to which the present disclosure pertains that the aerosol generating device 1 may further include other generally used components in addition to the ones shown in FIGS. 2 to 4.

In addition, although it is shown that the heater 13 is included in the aerosol generating device 1 in FIGS. 3 and 4, the heater 13 may be omitted as needed.

FIG. 2 illustrates a linear alignment of the sensing unit 10, the battery 11, the controller 12, and the heater 13. In addition, FIG. 3 illustrates a linear alignment of the battery 11, the controller 12, the vaporizer 14, and the heater 13. Further, FIG. 4 illustrates a parallel alignment of the vaporizer 14 and the heater 13. However, the internal structure of the aerosol generating device 1 is not limited to what is shown in FIGS. 2 to 4. That is, such alignments of the sensing unit 10, the battery 11, the controller 12, the heater 13, and the vaporizer 14 may be changed depending on the design of the aerosol generating device 1.

When the cigarette 2 is inserted into the aerosol generating device 1, the aerosol generating device 1 may actuate the heater 13 and/or the vaporizer 14 to generate an aerosol. The aerosol generated by the heater 13 and/or the vaporizer 14 may pass through the cigarette 2 into the user.

Even when the cigarette 2 is not inserted in the aerosol generating device 1, the aerosol generating device 1 may heat the heater 13, as needed.

The battery 11 may supply power to be used to operate the aerosol generating device 1. For example, the battery 11 may supply power to heat the heater 13 or the vaporizer 14, and may supply power required for the controller 12 to operate. In addition, the battery 11 may supply power required to operate a display, a sensor, a motor, or the like installed in the aerosol generating device 1.

The controller 12 may control the overall operation of the aerosol generating device 1. For example, the controller 12 may control respective operations of other components included in the aerosol generating device 1, in addition to the sensing unit 10, the battery 11, the heater 13, and the vaporizer 14. In addition, the controller 12 may verify a state of each of the components of the aerosol generating device 1 to determine whether the aerosol generating device 1 is in an operable state.

The controller 12 may include at least one processor. The at least one processor may be implemented as an array of a plurality of logic gates, or may be implemented as a combination of a general-purpose microprocessor and a memory in which a program executable by the microprocessor is stored. In addition, it is to be understood by those having ordinary skill in the art to which the disclosure pertains that the at least one processor may be implemented in other types of hardware.

The heater 13 may be heated by the power supplied by the battery 11. For example, when the cigarette is inserted in the aerosol generating device 1, the heater 13 may be disposed outside the cigarette. The heated heater 13 may thus raise the temperature of an aerosol generating material in the cigarette.

The heater 13 may be an electrically resistive heater. In this example, the heater 13 may include an electrically conductive track, and the heater 13 may be heated as a current flows through the electrically conductive track. However, the heater 13 is not limited to the foregoing example, and any example of heating the heater 13 up to a desired temperature may be applicable without limitation. The desired temperature may be preset in the aerosol generating device 1 or may be set by the user.

For another example, the heater 13 may be an induction heater. Specifically, the heater 13 may include an electrically conductive coil for heating the cigarette in an induction heating manner, and the cigarette may include a susceptor to be heated by the induction heater.

For example, the heater 13 may include a tubular heating element, a plate-shaped heating element, a needle-shaped heating element, or a rod-shaped heating element, and may heat the inside or outside of the cigarette 2 according to the shape of a heating element.

In addition, the heater 13 may be provided as a plurality of heaters in the aerosol generating device 1. In this case, the heaters 13 may be disposed to be inserted into the cigarette 2, or may be disposed outside the cigarette 2. In addition, some of the heaters 13 may be disposed to be inserted into the cigarette 2, and the rest may be disposed outside the cigarette 2. However, the shape of the heater 13 is not limited to what is shown in FIGS. 2 to 4 but may be provided in various shapes.

The vaporizer 14 may heat a liquid composition to generate an aerosol, and the generated aerosol may pass through the cigarette 2 into the user. That is, the aerosol generated by the vaporizer 14 may travel along an airflow path of the aerosol generating device 1, and the airflow path may be configured such that the aerosol generated by the vaporizer 14 passes through the cigarette 2 into the user.

For example, the vaporizer 14 may include a liquid storage, a liquid transfer means, and a heating element. However, embodiments are not limited thereto. For example, the liquid storage, the liquid transfer means, and the heating element may be included as independent modules in the aerosol generating device 1.

The liquid storage may store the liquid composition. The liquid composition may be, for example, a liquid including a tobacco-containing material that includes a volatile tobacco flavor component, or may be a liquid including a non-tobacco material. The liquid storage may be manufactured to be detachable and attachable from and to the vaporizer 14, or may be manufactured in an integral form with the vaporizer 14.

The liquid composition may include, for example, water, a solvent, ethanol, a plant extract, a fragrance, a flavoring agent, or a vitamin mixture. The fragrance may include, for example, menthol, peppermint, spearmint oil, various fruit flavors, and the like. However, embodiments are not limited thereto. The flavoring agent may include ingredients that provide the user with a variety of flavors or scents. The vitamin mixture may be a mixture of at least one of vitamin A, vitamin B, vitamin C, and vitamin E. However, embodiments are not limited thereto. The liquid composition may also include an aerosol former such as glycerin and propylene glycol.

The liquid transfer means may transfer the liquid composition in the liquid storage to the heating element. The liquid transfer means may be, for example, a wick such as cotton fiber, ceramic fiber, glass fiber, or porous ceramic. However, embodiments are not limited thereto.

The heating element may be an element for heating the liquid composition transferred by the liquid transfer means. The heating element may be, for example, a metal heating wire, a metal heating plate, a ceramic heater, or the like. However, embodiments are not limited thereto. In addition, the heating element may include a conductive filament such as a nichrome wire, and may be arranged in a structure wound around the liquid transfer means. The heating element may be heated as a current is supplied and may transfer heat to the liquid composition in contact with the heating element, and may thereby heat the liquid composition. As a result, an aerosol may be generated.

For example, the vaporizer 14 may also be referred to as a cartomizer or an atomizer. However, embodiments are not limited thereto.

Meanwhile, the aerosol generating device 1 may further include general-purpose components in addition to the sensing unit 10, the battery 11, the controller 12, the heater 13, and the vaporizer 14. For example, the aerosol generating device 1 may include a display that outputs visual information and/or a motor that outputs tactile information.

According to an embodiment, the sensing unit 10 may include one or more biosensors. For example, the biosensors may include one or more of a blood pressure sensor, an electrocardiogram sensor, or a blood oxygen saturation sensor. The biosensors may include sensors configured to measure biosignals of the user, and are not limited to the embodiments described above. When the user grabs the aerosol generating device 1, a biosignal of the user may be measured.

According to an embodiment, the sensing unit 10 may include a sensor configured to measure a body composition of the user. For example, the body composition may include a skeletal muscle mass, a basal metabolic rate, a body water content, and a body fat mass. When the user grabs the aerosol generating device 1, the body composition of the user may be measured.

According to an embodiment, the sensing unit 10 may further include a puff detection sensor, a temperature detection sensor, a cigarette insertion detection sensor. In addition, the aerosol generating device 1 may be manufactured to have a structure in which external air may be introduced or internal gas may flow out even with the cigarette 2 being inserted.

Although not shown in FIGS. 2 to 4, the aerosol generating device 1 may constitute a system along with a separate cradle. For example, the cradle may be used to charge the battery 11 of the aerosol generating device 1. Alternatively, the cradle may be used to heat the heater 13, with the cradle and the aerosol generating device 1 coupled.

The cigarette 2 may be of a similar type to a general burning type. For example, the cigarette 2 may be divided into a first portion including an aerosol generating material and a second portion including a filter or the like. Alternatively, the second portion of the cigarette 2 may also include the aerosol generating material. For example, the aerosol generating material provided in the form of granules or capsules may be inserted into the second portion.

The first portion may be entirely inserted into the aerosol generating device 1, and the second portion may be exposed outside. Alternatively, the first portion may be partially inserted into the aerosol generating device 1, and the first portion may be entirely inserted and the second portion may be partially inserted into the aerosol generating device 1. The user may then inhale an aerosol with the second portion in their mouth. In this case, an aerosol may be generated as external air passes through the first portion, and the generated aerosol may pass through the second portion into the mouth of the user.

For example, the external air may be introduced through at least one air path formed in the aerosol generating device 1. In this example, the opening or closing and/or the size of the air path formed in the aerosol generating device 1 may be adjusted by the user. Accordingly, an amount of atomization, a sense of smoking, or the like may be adjusted by the user. As another example, the external air may be introduced into the inside of the cigarette 2 through at least one hole formed on a surface of the cigarette 2.

Hereinafter, examples of the cigarette 2 will be described with reference to FIGS. 5 and 6.

Figure 5:
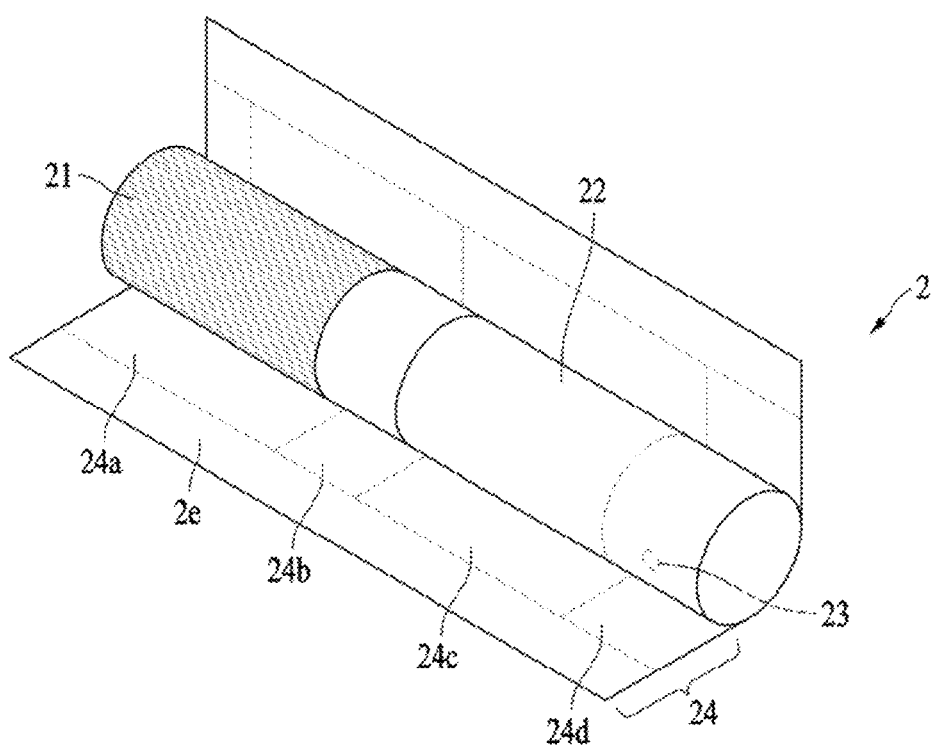
FIGS. 5 and 6 are perspective views of examples of a cigarette according to an example.
Figure 6:
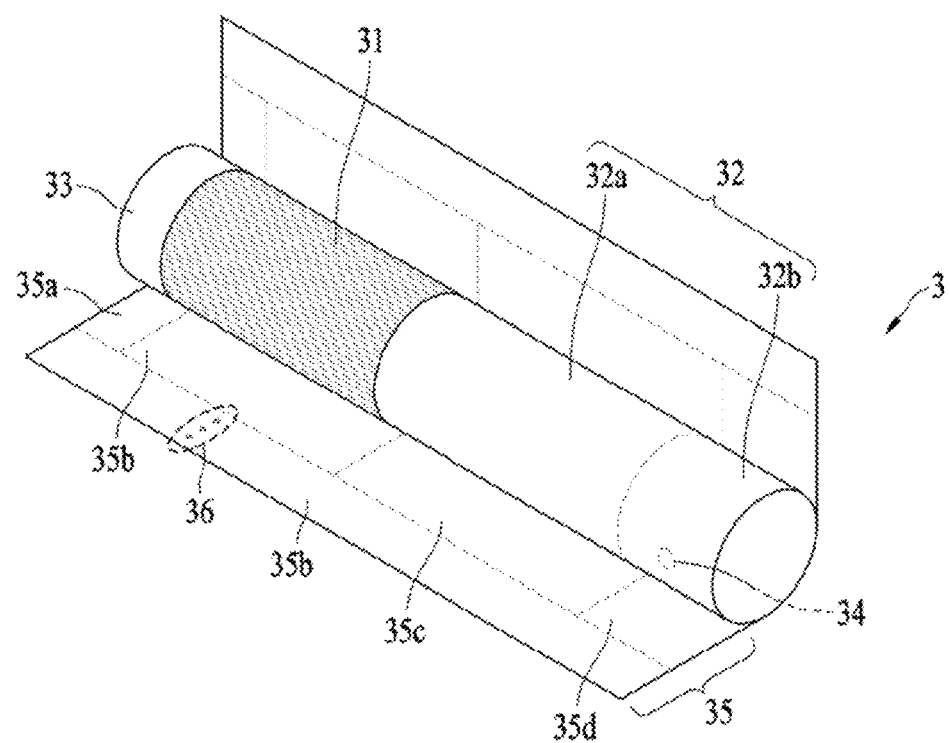

FIGS. 5 and 6 are perspective views of examples of a cigarette according to an example.

Referring to FIG. 5, the cigarette 2 may include a tobacco rod 21 and a filter rod 22. The first portion and the second portion described above with reference to FIGS. 2 to 4 may include the tobacco rod 21 and the filter rod 22, respectively.

Although the filter rod 22 is illustrated as having a single segment in FIG. 5, embodiments are not limited thereto. That is, the filter rod 22 may include a plurality of segments. For example, the filter rod 22 may include a segment that cools an aerosol and a segment that filters out certain components contained in an aerosol. In addition, the filter rod 22 may further include at least one segment that performs another function, as needed.

The diameter of the cigarette 2 may be in a range of 5 millimeters (mm) to 9 mm, and the length thereof may be about 48 mm. However, embodiments are not limited thereto. For example, the length of the tobacco rod 21 may be about 12 mm, the length of a first segment of the filter rod 22 may be about 10 mm, the length of a second segment of the filter rod 22 may be about 14 mm, and the length of a third segment of the filter rod 22 may be about 12 mm. However, embodiments are not limited thereto.

The cigarette 2 may be wrapped with at least one wrapper 24. The wrapper 24 may have at least one hole through which external air is introduced or internal gas is discharged outside. For example, the cigarette 2 may be wrapped with one wrapper 24. As another example, the cigarette 2 may be wrapped with two or more wrappers 24 in an overlapping manner. For example, the tobacco rod 21 may be wrapped with a first wrapper 24a, and the filter rod 22 may be wrapped with wrappers 24b, 24c, and 24d. In addition, the cigarette 2 may be entirely wrapped again with a single wrapper 24e. For example, when the filter rod 22 includes a plurality of segments, the segments may be wrapped with the wrappers 24b, 24c, and 24d, respectively.

The first wrapper 24a and the second wrapper 24b may be formed of general filter wrapping paper. For example, the first wrapper 24a and the second wrapper 24b may be porous wrapping paper or non-porous wrapping paper. In addition, the first wrapper 24a and the second wrapper 24b may be formed of oilproof paper and/or an aluminum laminated wrapping material.

The third wrapper 24c may be formed of hard wrapping paper. For example, the basis weight of the third wrapper 24c may be in a range of 88 grams per square meter ($g/m^2$) to 96 $g/m^2$, and may be desirably in a range of 90 $g/m^2$ to 94 $g/m^2$. In addition, the thickness of the third wrapper 24c may be in a range of 120 micrometers ($\mu m$) to 130 $\mu m$, and may be desirably 125 $\mu m$.

The fourth wrapper 24d may be formed of oilproof hard wrapping paper. For example, the basis weight of the fourth wrapper 24d may be in a range of 88 $g/m^2$ to 96 $g/m^2$, and may be desirably in a range of 90 $g/m^2$ to 94 $g/m^2$. In addition, the thickness of the fourth wrapper 24d may be in a range of 120 $\mu m$ to 130 $\mu m$, and may be desirably 125 $\mu m$.

The fifth wrapper 24e may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 24e may be in a range of 57 $g/m^2$ to 63 $g/m^2$, and may be desirably 60 $g/m^2$. In addition, the thickness of the fifth wrapper 24e may be in a range of 64 $\mu m$ to 70 $\mu m$, and may be desirably 67 $\mu m$.

The fifth wrapper 24e may have a predetermined material internally added thereto. The material may be, for example, silicon. However, embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied (or coated) to the fifth wrapper 24e without limitation.

The fifth wrapper 24e may prevent the cigarette 2 from burning. For example, there may be a probability that the cigarette 2 burns when the tobacco rod 21 is heated by the heater 13. For example, when the temperature rises above an ignition point of any one of materials included in the tobacco rod 21, the cigarette 2 may burn. Even in this case, it may still be possible to prevent the cigarette 2 from burning because the fifth wrapper 24e includes a non-combustible material.

In addition, the fifth wrapper 24e may prevent a holder from being contaminated by substances produced in the cigarette 2. For example, liquid substances may be produced in the cigarette 2 by puffs from the user. For example, as an aerosol generated in the cigarette 2 is cooled by external air, such liquid substances (e.g., water, etc.) may be produced. Thus, wrapping the cigarette 2 with the fifth wrapper 24e may prevent the liquid substances produced in the cigarette 2 from leaking out of the cigarette 2.

The tobacco rod 21 may include an aerosol generating material. The aerosol generating material may include, for example, at least one of glycerin, propylene glycol, ethylene glycol, dipropylene glycol, diethylene glycol, triethylene glycol, tetraethylene glycol, and oleyl alcohol. However, embodiments are not limited thereto. The tobacco rod 21 may also include other additives, such as, for example, a flavoring agent, a wetting agent, and/or an organic acid. In addition, the tobacco rod 21 may include a flavoring liquid such as menthol or a moisturizing agent that is added as being sprayed onto the tobacco rod 21.

The tobacco rod 21 may be manufactured in various forms. For example, the tobacco rod 21 may be manufactured as a sheet or as a strand. The tobacco rod 21 may also be formed with a cut tobacco filler from finely cut tobacco sheets. In addition, the tobacco rod 21 may be enveloped by a heat-conductive material. The heat-conductive material may be, for example, a metal foil such as an aluminum foil. However, embodiments are not limited thereto. For example, the heat-conductive material enveloping the tobacco rod 21 may evenly distribute the heat transferred to the tobacco rod 21 to improve the thermal conductivity to be applied to the tobacco rod 21, thereby improving the taste of tobacco. In addition, the thermally conductive material enveloping the tobacco rod 21 may function as a susceptor heated by an induction heater. In this case, although not shown, the tobacco rod 21 may further include an additional susceptor in addition to the thermally conductive material enveloping the outside thereof.

The filter rod 22 may be a cellulose acetate filter. However, there is no limit to the shape of the filter rod 22. For example, the filter rod 22 may be a cylindrical rod, or a tubular rod including a hollow therein. The filter rod 22 may also be a recess-type rod. For example, when the filter rod 22 includes a plurality of segments, at least one of the segments may be manufactured in a different shape.

A first segment of the filter rod 22 may be a cellulose acetate filter. For example, the first segment may be a tubular structure including a hollow therein. The first segment may prevent internal materials of the tobacco rod 21 from being pushed back when the heater 13 is inserted and generate an aerosol cooling effect. A desirable diameter of the hollow included in the first segment may be adopted from a range of 2 mm to 4.5 mm. However, embodiments are not limited thereto.

A desirable length of the first segment may be adopted from a range of 4 mm to 30 mm. However, embodiments are not limited thereto. The length of the first segment may be desirably 10 mm. However, embodiments are not limited thereto.

The first segment may have a hardness that is adjustable through an adjustment of the content of a plasticizer in a process of manufacturing the first segment. In addition, the first segment may be manufactured by inserting a structure such as a film or a tube of the same or different materials inside (e.g., the hollow).

A second segment of the filter rod 22 may cool an aerosol generated as the heater 13 heats the tobacco rod 21. The user may thus inhale the aerosol cooled down to a suitable temperature.

The length or diameter of the second segment may be determined in various ways according to the shape of the cigarette 2. For example, a desirable length of the second segment may be adopted from a range of 7 mm to 20 mm. The length of the second segment may be desirably about 14 mm. However, embodiments are not limited thereto.

The second segment may be manufactured by weaving a polymer fiber. In this case, a flavoring liquid may be applied to fiber formed of a polymer. Alternatively, the second segment may be manufactured by weaving a separate fiber to which a flavoring liquid is applied and the fiber formed of the polymer together. Alternatively, the second segment may be formed with a crimped polymer sheet.

For example, the polymer may be prepared with a material selected from the group consisting of polyethylene (PE), polypropylene (PP), polyvinyl chloride (PVC), polyethylene terephthalate (PET), polylactic acid (PLA), cellulose acetate (CA) and aluminum foil.

As the second segment is formed with the woven polymer fiber or the crimped polymer sheet, the second segment may include a single channel or a plurality of channels extending in a longitudinal direction. A channel used herein may refer to a path through which a gas (e.g., air or aerosol) passes.

For example, the second segment formed with the crimped polymer sheet may be formed of a material having a thickness between about 5 μm and about 300 μm, for example, between about 10 μm and about 250 μm. In addition, the total surface area of the second segment may be between about 300 square millimeters per millimeter ($mm^2$/mm) and about 1000 $mm^2$/mm. Further, an aerosol cooling element may be formed from a material having a specific surface area between about 10 square millimeters per milligram ($mm^2$/mg) and about 100 $mm^2$/mg.

Meanwhile, the second segment may include a thread containing a volatile flavor ingredient. The volatile flavor ingredient may be menthol. However, embodiments are not limited thereto. For example, the thread may be filled with a sufficient amount of menthol to provide at least 1.5 milligrams (mg) of menthol to the second segment.

A third segment of the filter rod 22 may be a cellulose acetate filter. A desirable length of the third segment may be adopted from a range of 4 mm to 20 mm. For example, the length of the third segment may be about 12 mm. However, embodiments are not limited thereto.

The third segment may be manufactured such that a flavor is generated by spraying a flavoring liquid onto the third segment in a process of manufacturing the third segment. Alternatively, a separate fiber to which the flavoring liquid is applied may be inserted into the third segment. An aerosol generated in the tobacco rod 21 may be cooled as it passes through the second segment of the filter rod 22, and the cooled aerosol may pass through the third segment into the user. Accordingly, when a flavoring element is added to the third segment, the durability of the flavor to be carried to the user may be enhanced.

In addition, the filter rod 22 may include at least one capsule 23. The capsule 23 may perform a function of generating a flavor, or a function of generating an aerosol. For example, the capsule 23 may be of a structure in which a liquid containing a fragrance is wrapped with a film. The capsule 23 may have a spherical or cylindrical shape. However, embodiments are not limited thereto.

Referring to FIG. 6, a cigarette 3 may further include a front end plug 33. The front end plug 33 may be disposed on one side of a tobacco rod 31 opposite to a filter rod 32. The front end plug 33 may prevent the tobacco rod 31 from escaping to the outside, and may also prevent the aerosol liquefied from the tobacco rod 31 during smoking from flowing into an aerosol generating device (e.g., the aerosol generating device 1 of FIGS. 2 to 4).

The filter rod 32 may include a first segment 32a and a second segment 32b. The first segment 32a may correspond to the first segment of the filter rod 22 of FIG. 5, and the second segment 32b may correspond to the third segment of the filter rod 22 of FIG. 5.

The diameter and the total length of the cigarette 3 may correspond to the diameter and the total length of the cigarette 2 of FIG. 5. For example, the length of the front end plug 33 may be about 7 mm, the length of the tobacco rod 31 may be about 15 mm, the length of the first segment 32a may be about 12 mm, and the length of the second segment 32b may be about 14 mm. However, embodiments are not limited thereto.

The cigarette 3 may be wrapped with at least one wrapper 35. The wrapper 35 may have at least one hole through which external air flows inside or internal gas flows outside. For example, the front end plug 33 may be wrapped with a first wrapper 35a, the tobacco rod 31 may be wrapped with a second wrapper 35b, the first segment 32a may be wrapped with a third wrapper 35c, and the second segment 32b may be wrapped with a fourth wrapper 35d. In addition, the cigarette 3 may be entirely wrapped again with a fifth wrapper 35e.

In addition, at least one perforation 36 may be formed on the fifth wrapper 35e. For example, the perforation 36 may be formed in an area surrounding the tobacco rod 31. However, embodiments are not limited thereto. The perforation 36 may perform a function of transferring heat generated by the heater 13 shown in FIGS. 3 and 4 to the inside of the tobacco rod 31.

In addition, the second segment 32b may include at least one capsule 34. The capsule 34 may perform a function of generating a flavor or a function of generating an aerosol. For example, the capsule 34 may have a structure in which a liquid containing a fragrance is wrapped with a film. The capsule 34 may have a spherical or cylindrical shape. However, embodiments are not limited thereto.

The first wrapper 35a may be a combination of general filter wrapping paper and a metal foil such as an aluminum foil. For example, the total thickness of the first wrapper 35a may be in a range of 45 μm to 55 μm, and may be desirably 50.3 μm. In addition, the thickness of the metal foil of the first wrapper 35a may be in a range of 6 μm to 7 μm, and may be desirably 6.3 μm. In addition, the basis weight of the first wrapper 35a may be in a range of 50 g/m² to 55 g/m², and may be desirably 53 g/m².

The second wrapper 35b and the third wrapper 35c may be formed with general filter wrapping paper. The second wrapper 35b and the third wrapper 35c may each be, for example, porous wrapping paper or non-porous wrapping paper.

For example, the porosity of the second wrapper 35b may be 35000 CU. However, embodiments are not limited thereto. In addition, the thickness of the second wrapper 35b may be in a range of 70 μm to 80 μm, and may be desirably 78 μm. In addition, the basis weight of the second wrapper 35b may be in a range of 20 g/m² to 25 g/m², and may be desirably 23.5 g/m².

For example, the porosity of the third wrapper 35c may be 24000 CU. However, embodiments are not limited thereto. In addition, the thickness of the third wrapper 35c may be in a range of 60 μm to 70 μm, and may be desirably 68 μm. In addition, the basis weight of the third wrapper 35c may be in a range of 20 g/m² to 25 g/m², and may be desirably 21 g/m².

The fourth wrapper 35d may be formed with polylactic acid (PLA) laminated paper. The PLA laminated paper may refer to three-ply paper including a paper layer, a PLA layer, and a paper layer. For example, the thickness of the fourth wrapper 35d may be in a range of 100 μm to 120 μm, and may be desirably 110 μm. In addition, the basis weight of the fourth wrapper 35d may be in a range of 80 g/m² to 100 g/m², and may be desirably 88 g/m².

The fifth wrapper 35e may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 35e may be in a range of 57 g/m² to 63 g/m², and may be desirably 60 g/m². In addition, the thickness of the fifth wrapper 35e may be in a range of 64 μm to 70 μm, and may be desirably 67 μm.

The fifth wrapper 35e may have a predetermined material internally added thereto. The material may be, for example, silicon. However, embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied (or coated) to the fifth wrapper 35e without limitation.

The front end plug 33 may be formed of cellulose acetate. For example, the front end plug 33 may be manufactured by adding a plasticizer (e.g., triacetin) to cellulose acetate tow: The mono denier of a filament constituting the cellulose acetate tow may be in a range of 1.0 to 10.0, and may be desirably in a range of 4.0 to 6.0. The mono denier of the filament of the front end plug 33 may be more desirably 5.0. In addition, a cross section of the filament constituting the front end plug 33 may be Y-shaped. The total denier of the front end plug 33 may be in a range of 20000 to 30000, and may be desirably in a range of 25000 to 30000. The total denier of the front end plug 33 may be more desirably 28000.

In addition, as needed, the front end plug 33 may include at least one channel, and a cross-sectional shape of the channel may be provided in various ways.

The tobacco rod 31 may correspond to the tobacco rod 21 described above with reference to FIG. 5. Thus, a detailed description of the tobacco rod 31 will be omitted here.

The first segment 32a may be formed of cellulose acetate. For example, the first segment may be a tubular structure including a hollow therein. The first segment 32a may be manufactured by adding a plasticizer (e.g., triacetin) to cellulose acetate tow. For example, the mono denier and the total denier of the first segment 32a may be the same as the mono denier and the total denier of the front end plug 33.

The second segment 32b may be formed of cellulose acetate. The mono denier of a filament constituting the second segment 32b may be in a range of 1.0 to 10.0, and may be desirably in a range of 8.0 to 10.0. The mono denier of the filament of the second segment 32b may be more desirably 9.0. In addition, a cross section of the filament of the second segment 32b may be Y-shaped. The total denier of the second segment 32b may be in a range of 20000 to 30000, and may be desirably 25000.

Figure 7:
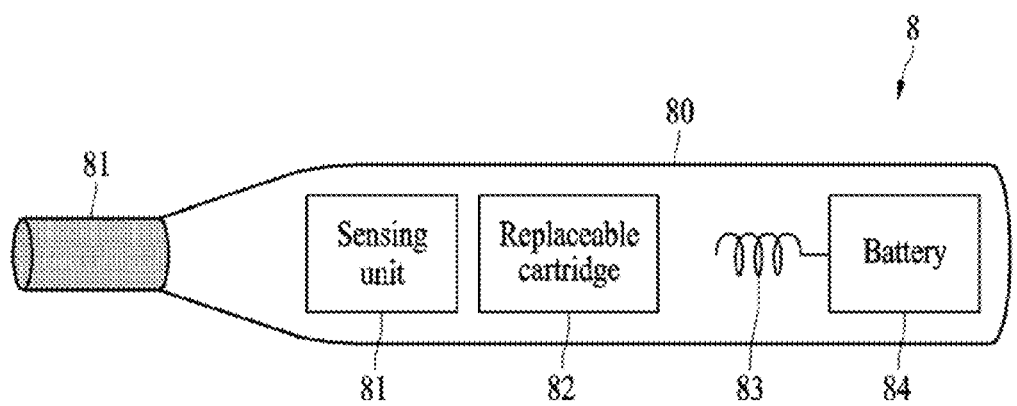
FIG. 7 is a block diagram illustrating an aerosol generating device according to another example.

FIG. 7 is a block diagram illustrating an aerosol generating device according to another example.

According to an embodiment, an aerosol generating device 8 may include a housing 80, a sensing unit 81, a replaceable cartridge (or liquid-type cartridge) 82, a coil 83, and a battery 84. The aerosol generating device 8 may operate in a different manner from that of the aerosol generating device 1 described above with reference to FIGS. 2 to 6. For example, the coil 83 may generate heat by receiving energy from the battery 84. The replaceable cartridge 82 may generate an aerosol using the heat generated by the coil 83. A user may inhale the generated aerosol through an opening 81 (or a tip portion).

According to an embodiment, the description of the sensing unit 81 may be replaced with the description of the sensing unit 10 provided above with reference to FIGS. 2 to 4.

Figure 8:
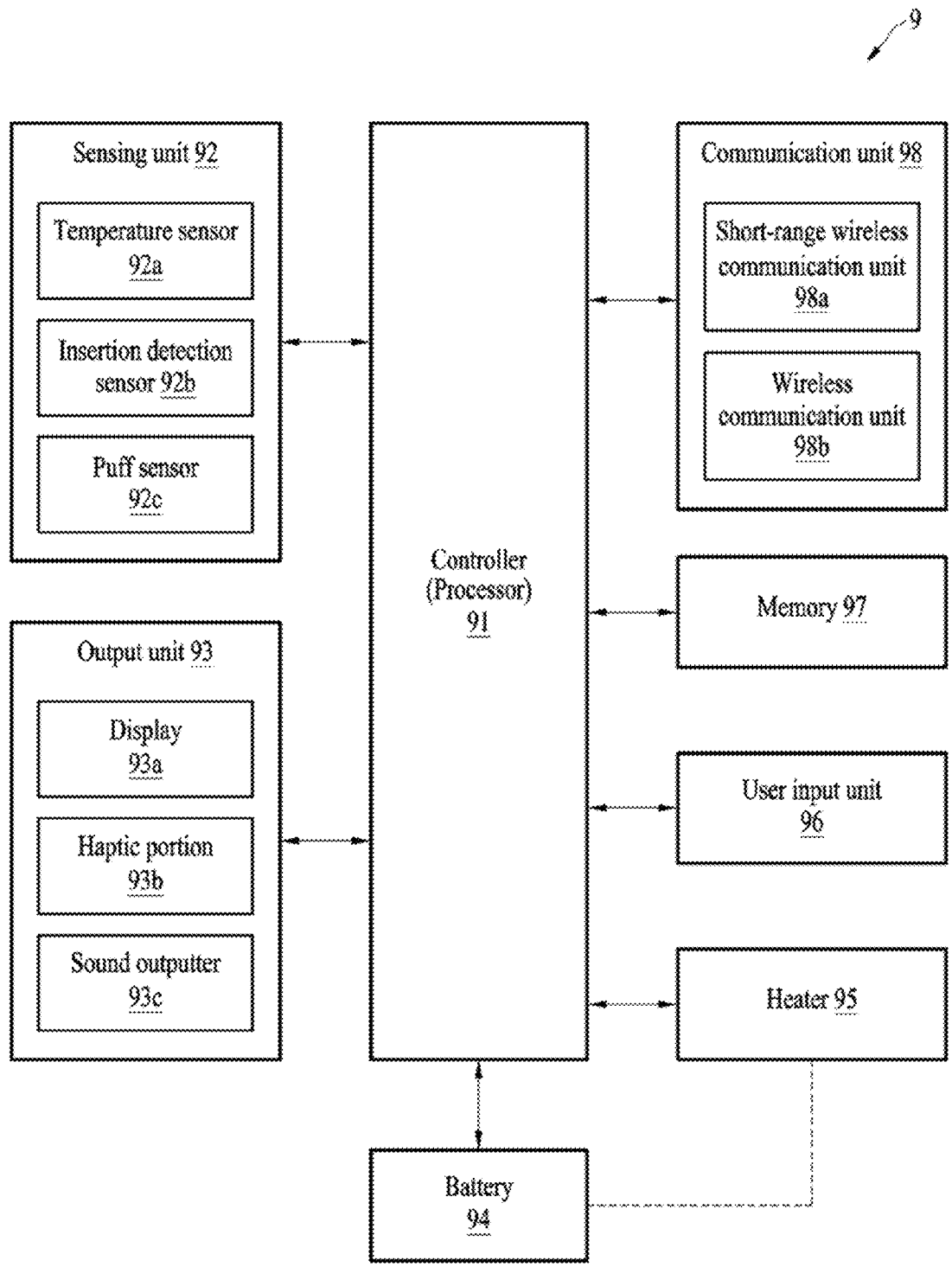
FIG. 8 is a block diagram illustrating an aerosol generating device according to still another example.

FIG. 8 is a block diagram illustrating an aerosol generating device according to still another example.

According to an embodiment, an aerosol generating device 9 may include a controller 91, a sensing unit 92, an output unit 93, a battery 94, a heater 95, a user input unit 96, a memory 97, and a communication unit 98. However, the internal structure of the aerosol generating device 9 is not limited to what is shown in FIG. 8. It is to be understood by those having ordinary skill in the art to which the disclosure pertains that some of the components shown in FIG. 8 may be omitted or new components may be added according to the design of the aerosol generating device 9.

The sensing unit 92 may sense a state of the aerosol generating device 9 or a state of an environment around the aerosol generating device 9, and transmit sensing information obtained through the sensing to the controller 91. Based on the sensing information, the controller 91 may control the aerosol generating device 9 to control operations of the heater 95, restrict smoking, determine whether an aerosol generating article (e.g., a cigarette, a cartridge, etc.) is inserted, display a notification, and perform other functions.

The sensing unit 92 may include at least one of a temperature sensor 92a, an insertion detection sensor 92b, and a puff sensor 92c. However, embodiments are not limited thereto. For example, the sensing unit 92 may include the sensors of the sensing unit 10 or the sensing unit 81 described above with reference to FIGS. 2 to 8.

The temperature sensor 92a may sense a temperature at which the heater 95 (or an aerosol generating material) is heated. The aerosol generating device 9 may include a separate temperature sensor for sensing a temperature of the heater 95, or the heater 95 itself may perform a function as a temperature sensor. Alternatively, the temperature sensor 92a may be arranged around the battery 94 to monitor a temperature of the battery 94.

The insertion detection sensor 92b may sense whether the aerosol generating article is inserted or removed. The insertion detection sensor 92b may include, for example, at least one of a film sensor, a pressure sensor, a light sensor, a resistive sensor, a capacitive sensor, an inductive sensor, and an infrared sensor, which may sense a signal change by the insertion or removal of the aerosol generating article.

The puff sensor 92c may sense a puff from a user based on various physical changes in an airflow path or airflow channel. For example, the puff sensor 92c may sense the puff based on any one of a temperature change, a flow change, a voltage change, and a pressure change.

The sensing unit 92 may further include at least one of a temperature/humidity sensor, a barometric pressure sensor, a magnetic sensor, an acceleration sensor, a gyroscope sensor, a position sensor (e.g., a global positioning system (GPS)), a proximity sensor, and a red, green, blue (RGB) sensor (e.g., an illuminance sensor), in addition to the sensors 92a through 92c described above. A function of each sensor may be intuitively inferable from its name by those having ordinary skill in the art, and thus a more detailed description thereof will be omitted here.

The output unit 93 may output information about the state of the aerosol generating device 9 and provide the information to the user. The output unit 93 may include at least one of a display 93a, a haptic portion 93b, and a sound outputter 93c. However, embodiments are not limited thereto. When the display 93a and a touchpad are provided in a layered structure to form a touchscreen, the display 93a may be used as an input device in addition to an output device.

The display 93a may visually provide the information about the aerosol generating device 9 to the user. The information about the aerosol generating device 9 may include, for example, a charging/discharging state of the battery 94 of the aerosol generating device 9, a preheating state of the heater 95, an insertion/removal state of the aerosol generating article, a limited usage state (e.g., an abnormal article detected) of the aerosol generating device 9, or the like, and the display 93a may externally output the information. The display 93a may be, for example, a liquid-crystal display panel (LCD), an organic light-emitting display panel (OLED), or the like. The display 93a may also be in the form of a light-emitting diode (LED) device.

The haptic portion 93b may provide the information about the aerosol generating device 9 to the user in a haptic way by converting an electrical signal into a mechanical stimulus or an electrical stimulus. The haptic portion 93b may include, for example, a motor, a piezoelectric element, or an electrical stimulation device.

The sound outputter 93c may provide the information about the aerosol generating device 9 to the user in an auditory way. For example, the sound outputter 93c may convert an electrical signal into a sound signal and externally output the sound signal.

The battery 94 may supply power to be used to operate the aerosol generating device 9. The battery 94 may supply power to heat the heater 95. In addition, the battery 94 may supply power required for operations of the other components (e.g., the sensing unit 92, the output unit 93, the user input unit 96, the memory 97, and the communication unit 98) included in the aerosol generating device 9. The battery 94 may be a rechargeable battery or a disposable battery. The battery 94 may be, for example, a lithium polymer (LiPoly) battery: However, embodiments are not limited thereto.

The heater 95 may receive power from the battery 94 to heat the aerosol generating material. Although not shown in FIG. 8, the aerosol generating device 9 may further include a power conversion circuit (e.g., a direct current (DC)-to-DC (DC/DC) converter) that converts power of the battery 94 and supplies the power to the heater 95. In addition, when the aerosol generating device 9 generates an aerosol in an induction heating manner, the aerosol generating device 9 may further include a DC-to-alternating current (AC) (DC/AC) converter that converts DC power of the battery 94 into AC power.

The controller 91, the sensing unit 92, the output unit 93, the user input unit 96, the memory 97, and the communication unit 98 may receive power from the battery 94 to perform functions. Although not shown in FIG. 8, a power conversion circuit, for example, a low dropout (LDO) circuit or a voltage regulator circuit, which converts power of the battery 94 and supplies the power to respective components, may further be included.

In an embodiment, the heater 95 may be formed of an electrically resistive material that is suitable. The electrically resistive material may be a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like. However, embodiments are not limited thereto. In addition, the heater 95 may be implemented as a metal heating wire, a metal heating plate on which an electrically conductive track is arranged, a ceramic heating element, or the like. However, embodiments are not limited thereto.

In another embodiment, the heater 95 may be an induction heater. For example, the heater 95 may include a susceptor that heats the aerosol generating material by generating heat through a magnetic field applied by a coil.

In an embodiment, the heater 95 may include a plurality of heaters. For example, the heater 95 may include a first heater for heating a cigarette and a second heater for heating a liquid.

The user input unit 96 may receive information input from the user or may output information to the user. For example, the user input unit 96 may include a keypad, a dome switch, a touchpad (e.g., a contact capacitive type, a pressure resistive film type, an infrared sensing type, a surface ultrasonic conduction type, an integral tension measurement type, a piezo effect method, etc.), a jog wheel, a jog switch, or the like. However, embodiments are not limited thereto. In addition, although not shown in FIG. 8, the aerosol generating device 9 may further include a connection interface such as a USB interface, and may be connected to another external device through the connection interface such as a USB interface to transmit and receive information or to charge the battery 94.

The memory 97, which is hardware for storing various pieces of data processed in the aerosol generating device 9, may store data processed by the controller 91 and data to be processed thereby. The memory 97 may include at least one type of storage medium of a flash memory type memory, a hard disk type memory, a multimedia card micro type memory, a card type memory (e.g., an SD or XE memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The memory 97 may store an operating time of the aerosol generating device 9, a maximum number of puffs, a current number of puffs, at least one temperature profile, data associated with a smoking pattern of the user, or the like.

The communication unit 98 may include at least one component for communicating with another electronic device. For example, the communication unit 98 may include a short-range wireless communication unit 98a and a wireless communication unit 98b.

The short-range wireless communication unit 98a may include a Bluetooth communication unit, a BLE communication unit, a near field communication unit, a WLAN (Wi-Fi) communication unit, a ZigBee communication unit, an infrared data association (IrDA) communication unit, a Wi-Fi direct (WFD) communication unit, an ultra-wideband (UWB) communication unit, and an Ant+ communication unit. However, embodiments are not limited thereto.

The wireless communication unit 98b may include, for example, a cellular network communication unit, an Internet communication unit, a computer network (e.g., a local area network (LAN) or a wide-area network (WAN)) communication unit, or the like. However, embodiments are not limited thereto. The wireless communication unit 98b may use subscriber information (e.g., international mobile subscriber identity (IMSI)) to identify and authenticate the aerosol generating device 9 in a communication network.

The controller 91 may control the overall operation of the aerosol generating device 9. In an embodiment, the controller 91 may include at least one processor. The at least one processor may be implemented as an array of a plurality of logic gates, or may be implemented as a combination of a general-purpose microprocessor and a memory in which a program executable by the microprocessor is stored. In addition, it is to be understood by those having ordinary skill in the art to which the present disclosure pertains that it may be implemented in other types of hardware.

The controller 91 may control the temperature of the heater 95 by controlling the supply of power from the battery 94 to the heater 95. For example, the controller 91 may control the supply of power by controlling switching of a switch element between the battery 94 and the heater 95. For another example, a direct heating circuit may control the supply of power to the heater 95 according to a control command from the controller 91.

The controller 91 may analyze a sensing result obtained by the sensing of the sensing unit 92 and control processes to be performed thereafter. For example, the controller 91 may control power to be supplied to the heater 95 to start or end an operation of the heater 95 based on the sensing result obtained by the sensing unit 92. For another example, the controller 91 may control an amount of power to be supplied to the heater 95 and a time for which the power is to be supplied, such that the heater 95 may be heated up to a predetermined temperature or maintained at a desired temperature, based on the sensing result of the sensing unit 92.

The controller 91 may control the output unit 93 based on the sensing result of the sensing unit 92. For example, when the number of puffs counted through the puff sensor 92c reaches a preset number, the controller 91 may inform the user that the aerosol generating device 9 is to be ended soon, through at least one of the display 93a, the haptic portion 93b, and the sound outputter 93c.

In an embodiment, the controller 91 may control a power supply time and/or a power supply amount for the heater 95 according to a state of the aerosol generating article sensed by the sensing unit 92. For example, when an aerosol generating material is in an over-humidified state, the controller 91 may control the power supply time for an inductive coil to increase a preheating time, compared to a case where the aerosol generating material is in a general state.

Figure 9:
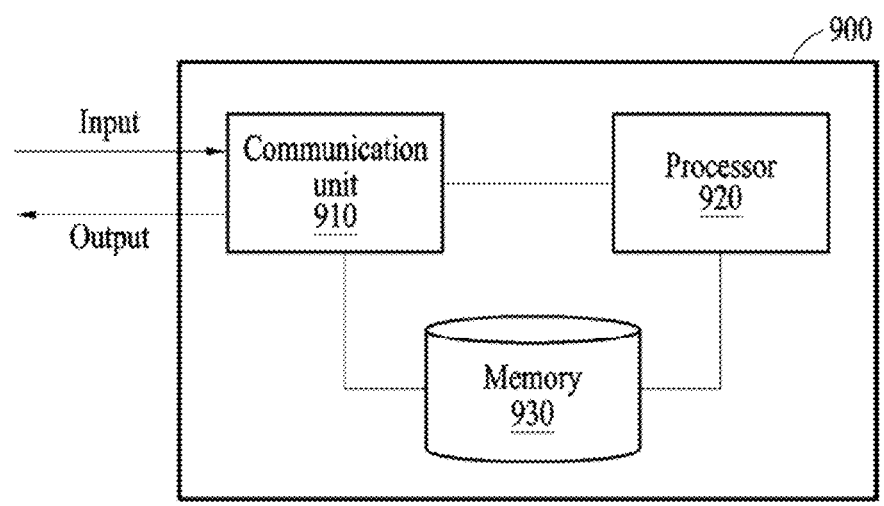
FIG. 9 is a diagram illustrating a configuration of a user terminal according to an embodiment.

FIG. 9 is a diagram illustrating a configuration of a user terminal according to an embodiment.

A user terminal 900 includes a communication unit 910, a processor 920, and a memory 930. For example, the electronic device 900 may be the user terminal 110 described above with reference to FIG. 1.

The communication unit 910 may be connected to the processor 920 and the memory 930 and transmit and receive data to and from the processor 920 and the memory 930. The communication unit 910 may be connected to another external device and transmit and receive data to and from the external device. Hereinafter, transmitting and receiving "A" may refer to transmitting and receiving "information or data indicating A".

The communication unit 910 may be implemented as a circuitry in the user terminal 900. For example, the communication unit 910 may include an internal bus and an external bus. As another example, the communication unit 910 may be an element configured to connect the user terminal 900 to an external device. The communication unit 910 may be an interface. The communication unit 910 may receive data from the external device and transmit the data to the processor 920 and the memory 930.

The processor 920 may process the data received by the communication unit 910 and data stored in the memory 930. A "processor" may be a hardware-implemented data processing device having a physically structured circuit to execute desired operations. The desired operations may include, for example, codes or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 920 may execute computer-readable code (e.g., software) stored in a memory (e.g., the memory 930) and instructions triggered by the processor 920.

The memory 930 may store therein the data received by the communication unit 910 and the data processed by the processor 920. For example, the memory 930 may store the program (or an application, or software). The program to be stored may be a set of syntaxes that are coded and executable by the processor 920 to manage smoking information of a user.

According to one aspect, the memory 930 may include, for example, at least one volatile memory, nonvolatile memory, random-access memory (RAM), flash memory, a hard disk drive, and an optical disc drive.

The memory 930 may store an instruction set (e.g., software) for operating the user terminal 900. The instruction set for operating the user terminal 900 may be executed by the processor 920.

The communication unit 910, the processor 920, and the memory 930 will be described in detail below with reference to FIGS. 11 to 14.

Figure 10:
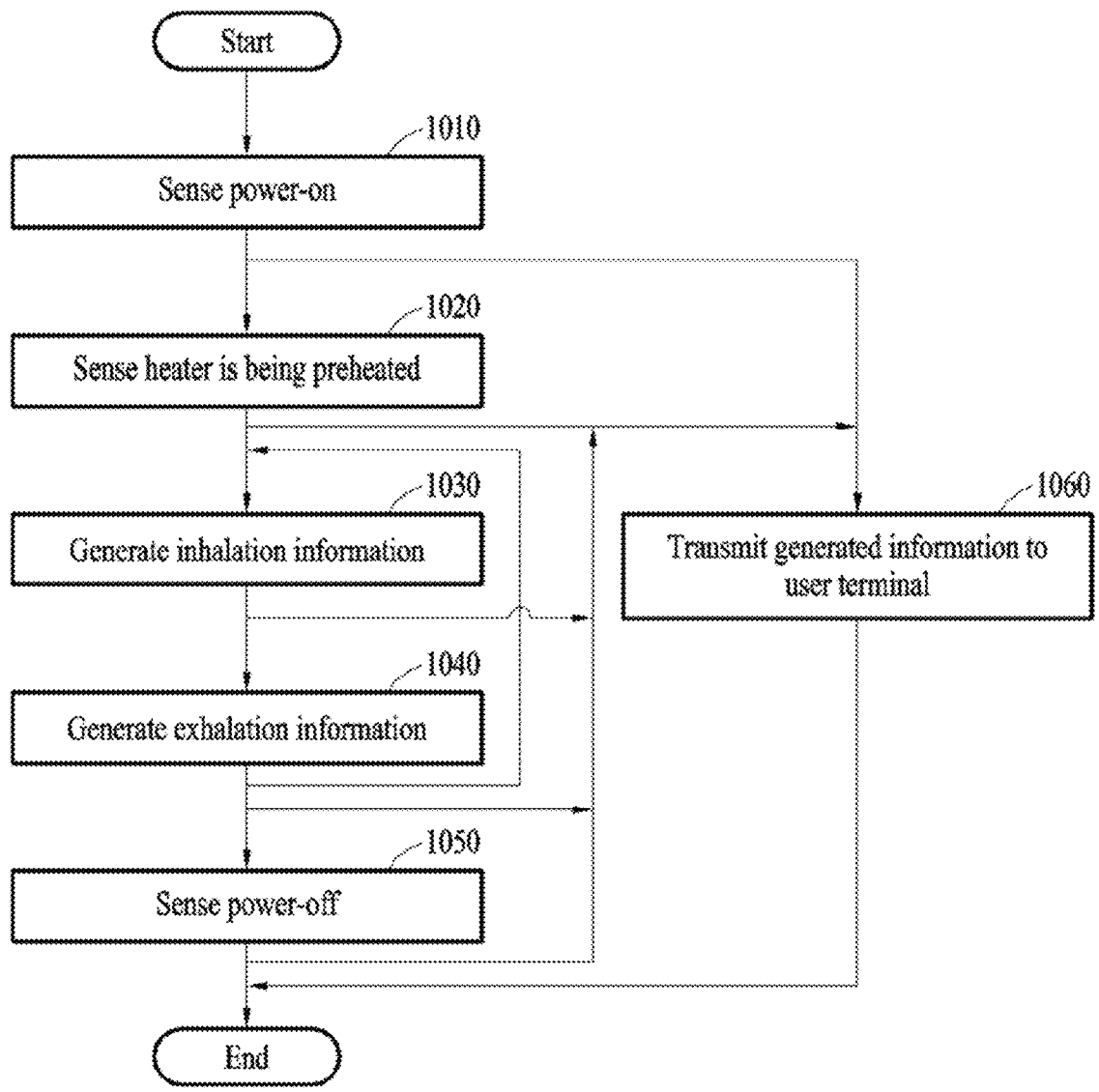
FIG. 10 is a flowchart illustrating a method of transmitting sensing information of an electronic cigarette to a user terminal, performed by the electronic cigarette, according to an embodiment.

FIG. 10 is a flowchart illustrating a method of transmitting sensing information of an electronic cigarette to a user terminal, performed by the electronic cigarette, according to an embodiment.

Operations 1010 to 1050 to be described below may be performed by an electronic cigarette (e.g., an aerosol generating device). The electronic cigarette may be the aerosol generating device 120 of FIG. 1, the aerosol generating device 1 of FIGS. 2 to 4, the aerosol generating device 8 of FIG. 7, or the aerosol generating device 9 of FIG. 8. In terms of the relationship with a user terminal (e.g., the user terminal 110 of FIG. 1 or the user terminal 900 of FIG. 9), the electronic cigarette may be referred to as an additional device.

In operation 1010, the electronic cigarette may sense its power-on. Subsequently, the electronic cigarette may transmit sensing information indicating its power-on to the user terminal (in operation 1060).

According to an embodiment, when the electronic cigarette is powered on, the electronic cigarette may automatically establish a mutual link through short-range wireless communication with the user terminal positioned in the vicinity of the electronic cigarette. The sensing information indicating the electronic cigarette is powered on may be transmitted to the user terminal through the established link.

In operation 1020, when a heater operates, the electronic cigarette may sense the heater is being preheated (or heated). Subsequently, the electronic cigarette may transmit sensing information indicating the heater is being preheated to the user terminal (in operation 1060).

In operation 1030, the electronic cigarette may detect an inhalation (i.e., a puff) of a user using a sensor, and generate inhalation information about the inhalation. For example, the electronic cigarette may detect an inhalation when a preset portion (e.g., a tip portion) of the electronic cigarette comes into contact with the skin of the user. As another example, the electronic cigarette may detect an inhalation when an airflow is generated in the electronic cigarette by the user.

According to an embodiment, the inhalation information may include at least one of an average flow velocity of an airflow according to an inhalation of the user, a cross-sectional area of a channel through which the airflow passes, or a duration of an inhalation resistance. The cross-sectional area of the channel through which the airflow passes may be predetermined according to the electronic cigarette.

According to an embodiment, the inhalation information may include a calculated amount of inhalation. For example, the electronic cigarette may calculate the amount of inhalation based on a speed (or average flow velocity) of the airflow; the cross-sectional area of the channel through which the airflow passes, and the duration of the inhalation resistance.

Subsequently, the electronic cigarette may transmit the inhalation information to the user terminal (in operation 1060).

In operation 1040, the electronic cigarette may detect an exhalation of the user using the sensor and generate exhalation information about the exhalation. For example, the electronic cigarette may detect an exhalation when the preset portion (e.g., the tip portion) of the electronic cigarette in contact with the skin of the user is taken away from the skin. As another example, the electronic cigarette may detect an exhalation when the airflow generated in the electronic cigarette by the user stops. As still another example, the electronic cigarette may detect an exhalation when a sound generated when the user exhales smoke is detected using a microphone.

Subsequently, the electronic cigarette may transmit the exhalation information to the user terminal (in operation 1060).

In operation 1050, the electronic cigarette may sense its power-off. Subsequently, the electronic cigarette may transmit sensing information indicating its power-off to the user terminal (in operation 1060).

According to an embodiment, when the electronic cigarette is powered off, the link established between the electronic cigarette and the user terminal may be automatically canceled.

In operation 1060, the electronic cigarette may transmit the generated sensing information to the user terminal.

According to an embodiment, while the electronic cigarette is powered on, the electronic cigarette may generate pose information of the electronic cigarette using at least one of a geomagnetic sensor, an acceleration sensor, a gyroscope sensor, or a position sensor continuously (e.g., at preset intervals). The electronic cigarette may transmit the pose information to the user terminal.

Figure 11:
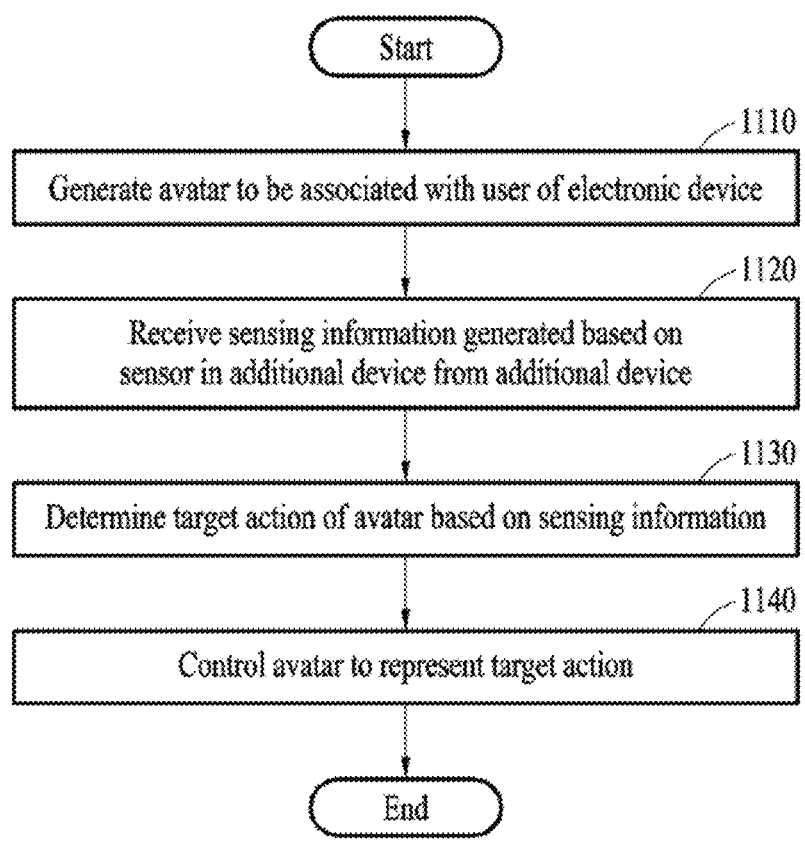
FIG. 11 is a flowchart illustrating a method of controlling an avatar, performed by a user terminal, according to an example.

FIG. 11 is a flowchart illustrating a method of controlling an avatar, performed by a user terminal, according to an example.

Operations 1110 through 1140 described below may be performed by the user terminal 900 described above with reference to FIG. 9.

In operation 1110, the user terminal 900 may generate an avatar to be associated with a user. For example, the avatar may be a computer graphical object disposed in a virtual space. The avatar may be a two-dimensional (2D) or three-dimensional (3D) modeled character. The avatar will be described in detail with reference to FIG. 12.

According to an embodiment, the user terminal 900 may author an avatar to correspond to user information using an authoring tool. For example, the authoring tool may use prestored libraries and templates to generate an avatar of a user.

According to an embodiment, the user information may include information received directly from the user by the user terminal 900. For example, the user may input the height, weight, age, and gender of the user into the user terminal 900 through a user interface of the user terminal 900. The user terminal 900 may determine a basic appearance of an avatar based on the user information. The basic appearance of the avatar is not limited to the embodiments described above, and may include graphical effects or animation effects that the user may visually recognize. The user terminal 900 may generate the avatar to represent the basic appearance visually. For example, the generated avatar may be output through the display of the user terminal 900.

In operation 1120, the user terminal 900 may receive sensing information generated based on a sensor in an additional device from the electronic cigarette. For example, when an electronic cigarette is powered on, the user terminal 900 and the additional device may establish a mutual link through short-range wireless communication, and sensing information may be received from the electronic cigarette through the established link.

For example, the sensing information may be information indicating the electronic cigarette is powered on.

As another example, the sensing information may be information indicating a heater of the electronic cigarette is being preheated.

As still another example, the sensing information may be pose information of the electronic cigarette.

In operation 1130, the user terminal 900 may determine a target action of the avatar based on the sensing information.

For example, when the sensing information is information indicating the electronic cigarette is powered on, the user terminal 900 may place the avatar of the user in a virtual space and determine the target action of the avatar to be an action of holding a cigarette in a hand.

As another example, when the sensing information is information indicating the heater of the electronic cigarette is being preheated, the user terminal 900 may determine the target action of the avatar to be an action of lighting a cigarette.

As still another example, when the sensing information is the pose information of the electronic cigarette, the user terminal 900 may determine the target action of the avatar to correspond to the pose information. That is, the target action of the avatar may be determined to mimic an actual action or motion of the user. For example, when the user takes a specific pose with his or her arms while holding the electronic cigarette, the target action of the avatar may be determined to show the corresponding pose.

As yet another example, when the sensing information is inhalation information related to inhalation of the user through the electronic cigarette, the user terminal 900 may determine the target action to correspond to the inhalation information.

As still another example, the user terminal 900 may determine an amount of inhalation based on the inhalation information related to inhalation of the user through the electronic cigarette, and when it is determined that the user takes the additional device off from the mouth based on the exhalation information, may determine the target action of the avatar to be an action of exhaling smoke based on the amount of inhalation. The amount of inhalation may be calculated based on an average flow velocity of an airflow according to an inhalation of the user, a cross-sectional area of a channel through which the airflow passes, and a duration of an inhalation resistance. Additionally, the user terminal 900 may determine at least one of an amount, a color, or a graphical effect (e.g., bubbles) of the smoke that the avatar exhales.

In operation 1140, the user terminal 900 may control the avatar placed in the virtual space to represent the target action.

Figure 12:
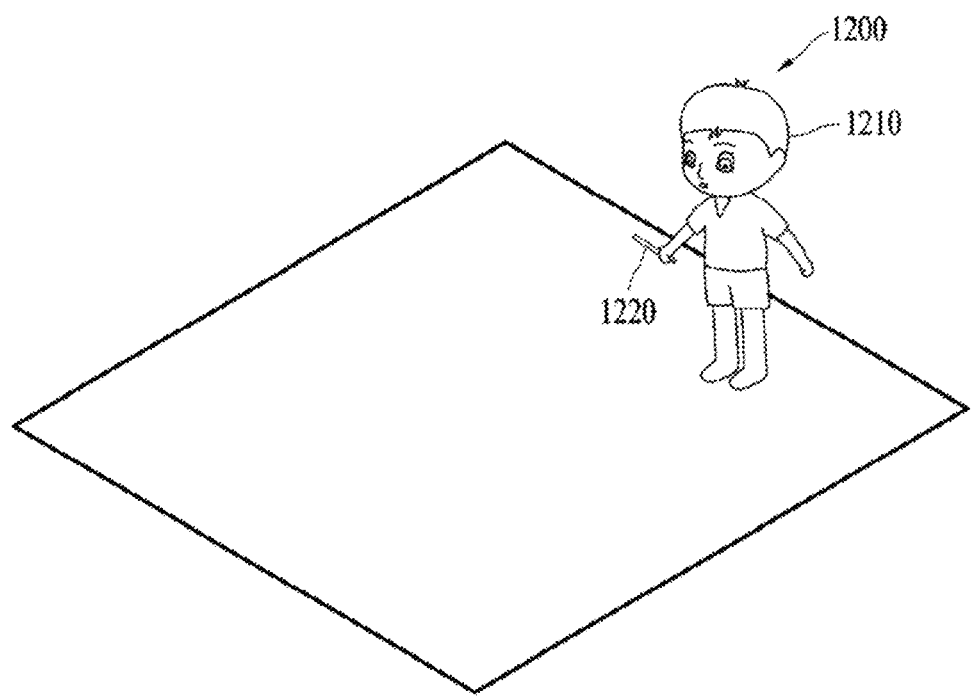
FIG. 12 illustrates an avatar placed in a virtual space according to an example.

FIG. 12 illustrates an avatar placed in a virtual space according to an example.

According to an embodiment, the user terminal 900 may generate a virtual space 1200 and place an avatar 1210 in the generated virtual space 1200.

For example, when an electronic cigarette is powered on, the avatar 1210 may hold a cigarette 1220 in a hand. The shape of the cigarette 1220 is not limited to a specific embodiment. As another example, if a user is not a smoker, a stick-shaped object other than the cigarette 1220 may be held.

As another example, when sensing information is information indicating a heater of the electronic cigarette is being preheated, the avatar 1210 may take an action of lighting the cigarette 1220. The lit cigarette 1220 may be output. When the preheating of the heater of the electronic cigarette is completed, the cigarette 1220 may produce smoke.

As another example, when the sensing information is pose information of the electronic cigarette, the avatar 1210 may act to correspond to the pose information. The avatar 1210 may act to mimic an actual action or motion of the user.

As still another example, when the sensing information indicates an inhalation of the user, the avatar 1210 may put the cigarette 1220 in its mouth.

As yet another example, when the sensing information indicates an exhalation of the user, the avatar 1210 may take the cigarette 1220 off from its mouth and exhale smoke. For example, the timing of exhaling smoke may be predetermined (e.g., 3 to 4 seconds after the user takes the electronic cigarette off from his or her mouth). The time for which smoke is exhaled may be a preset time or may be determined based on a calculated amount of inhalation. The amount of smoke exhaled by the avatar 1210 may be calculated based on the calculated amount of inhalation or may be set in advance by the user. Additionally, at least one of a color or a graphic effect of the smoke may be set in advance by the user.

According to an embodiment, the user terminal 900 may provide a user interface menu to the user to control an action or a motion of the avatar 1210. The user may adjust the position of the avatar 1210 in the virtual space or make the avatar 1210 perform a preset action (e.g., greeting, waving, or dancing) through the user interface menu.

Figure 13:
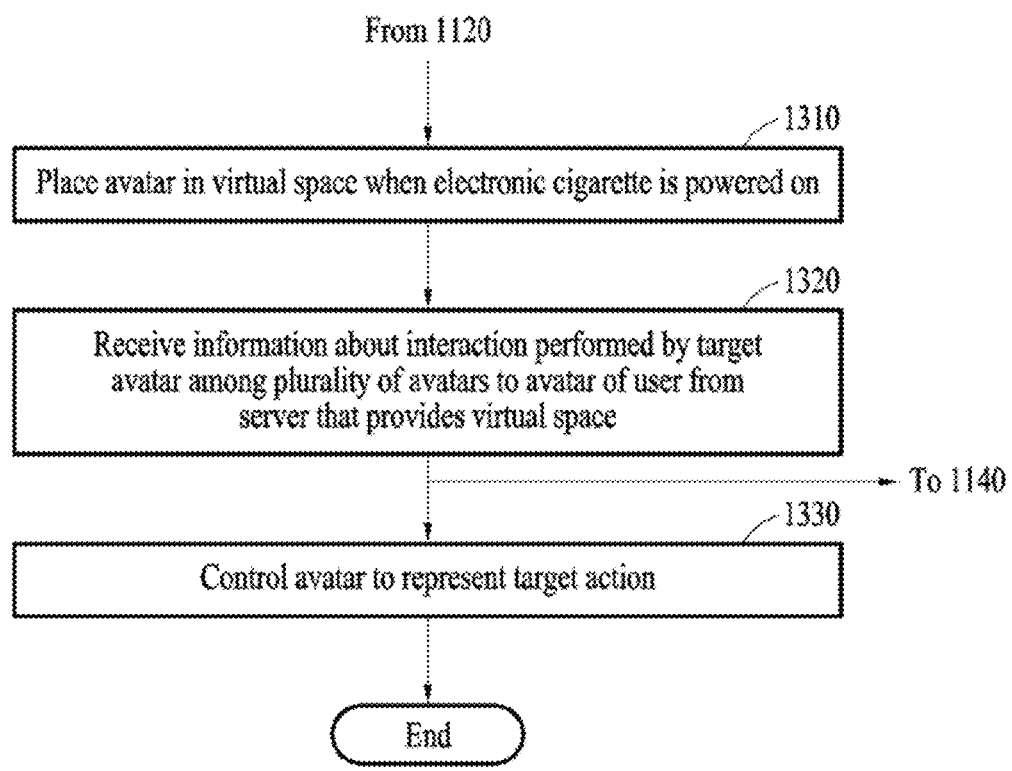
FIG. 13 is a flowchart illustrating a method of controlling an electronic cigarette based on interaction between avatars according to an example.

FIG. 13 is a flowchart illustrating a method of controlling an electronic cigarette based on interaction between avatars according to an example.

According to an embodiment, operations 1310 to 1330 to be described below may be further performed by the user terminal 900 after operation 1120 of FIG. 11 is performed.

In operation 1310, the user terminal 900 may place an avatar in a virtual space when an electronic cigarette is powered on. For example, the user terminal 900 may access a server (not shown) that provides the virtual space, and may place the avatar in the virtual space generated by the server. For example, a user of the user terminal 900 may select a target virtual space from among a plurality of virtual spaces provided by the server.

In a virtual space generated by the server, a plurality of avatars of different user terminals may be placed simultaneously. The avatars of the users may be placed in the same virtual space regardless of the actual physical distances between the users. After the avatar is placed in the virtual space, operations 1120 to 1140 described above may be performed subsequentl.

In operation 1320, the user terminal 900 may receive, from the server, information about an interaction performed by a target avatar among the plurality of avatars in the virtual space to the avatar of the user.

According to an embodiment, the users may interact with each other through the avatars. For example, the users may exchange information through conversations and chats through the avatars.

According to an embodiment, the users may use the same content (e.g., a game using avatars) through the avatars. For example, the game using avatars may be a game in which an avatar attacks an avatar of an opponent with the smoke that the avatar exhales.

According to an embodiment, the interaction may be a motion of the target avatar accessing the avatar of the user and trying to light a cigarette of the avatar.

In operation 1320, the user terminal 900 may control the avatar or the electronic cigarette based on the information about the interaction.

According to an embodiment, when an interaction of the target avatar accessing the avatar of the user and trying to light a cigarette of the avatar is requested, the user may accept the request. When the user accepts the request, the user terminal 900 may control the electronic cigarette to start preheating of a heater of the electronic cigarette.

Figure 14:
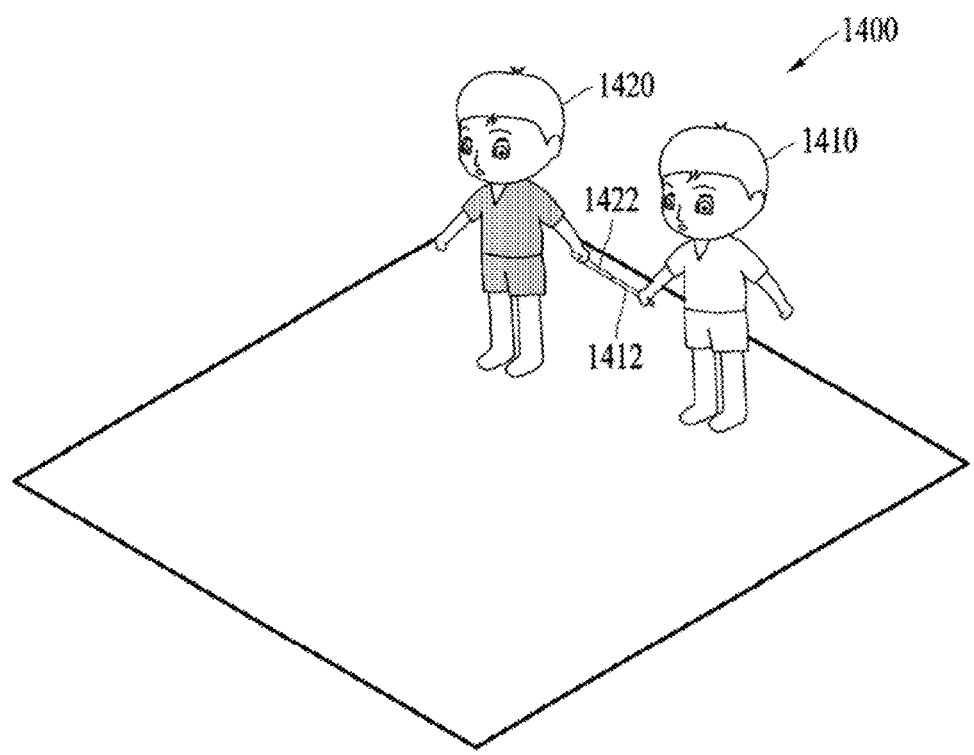
FIG. 14 illustrates a plurality of avatars placed in a virtual space according to an example.

FIG. 14 illustrates a plurality of avatars placed in a virtual space according to an example.

According to an embodiment, a plurality of avatars 1410 and 1420 may be placed in a virtual space provided by a server. Users may interact with each other through the avatars 1410 and 1420. For example, the server may provide pieces of content such as voice chats and games to the users.

According to an embodiment, an interaction of the target avatar 1420 accessing the avatar 1410 and trying to light a cigarette 1412 of the avatar 1410 may be requested to a user of the user terminal 900. A user of the target avatar 1420 may control the target avatar 1420 to perform the above action as a preset action through a user interface menu. For example, when a cigarette 1422 of the target avatar 1420 comes to contact the cigarette 1412 of the avatar 1412, the above interaction may occur. However, a specific embodiment of the above interaction is not limited to the described example, and various modifications may be made thereto. When the user of the avatar 1410 accepts the above interaction through the user terminal 900, the user terminal 900 may control an electronic cigarette connected to the user terminal 900 to start preheating of a heater of the electronic cigarette.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape: optical media such as CD-ROM discs, DVDs, and/or Blue-ray discs: magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

The invention claimed is:

1. A method of controlling an avatar, performed by an electronic device, the method comprising:
generating an avatar to be associated with a user of the electronic device;
receiving, from an additional device connected to the electronic device, sensing information generated based on one or more sensors in the additional device;

determining a target action of the avatar based on the sensing information; and controlling the avatar to represent the target action, wherein the determining of the target action of the avatar comprises:

determining the target action of the avatar to be an action of holding a cigarette in a hand, when the sensing information indicates the additional device is powered on;

determining the target action of the avatar to be an action of putting out or throwing out a cigarette, when the sensing information indicates the additional device is powered off;

determining an amount of inhalation based on inhalation information related to inhalation of the user through the additional device; and determining the target action of the avatar to be an action of blowing smoke based on the amount of inhalation, when it is determined the user takes the additional device off from his or her mouth, wherein the amount of inhalation is calculated based on an average flow velocity of an airflow according to an inhalation of the user, a cross-sectional area of a channel through which the airflow passes, and a duration of an inhalation resistance.

2. The method of claim 1, wherein
the generating of the avatar comprises:
determining a basic appearance of the avatar based on user information about the user; and
generating the avatar to represent the basic appearance visually.

3. The method of claim 1, wherein
the determining of the action of the avatar comprises determining the target action of the avatar to be an action of lighting a cigarette, when the sensing information indicates a heater of the additional device is being preheated.

4. The method of claim 1, wherein
the determining of the action of the avatar comprises determining, when the sensing information indicates pose information of the additional device, the target action of the avatar to correspond to the pose information.

5. The method of claim 1, wherein
the determining of the action of the avatar comprises determining, when the sensing information indicates inhalation information related to inhalation of the user through the additional device, the target action to correspond to the inhalation information.

6. The method of claim 1, wherein
the determining of the action of the avatar further comprises determining at least one of an amount, a color, or an effect of the smoke.

7. The method of claim 1, further comprising:
placing the avatar in a target virtual space where a plurality of avatars can be placed simultaneously, when the additional device is powered on.

8. The method of claim 7, wherein
the plurality of avatars are able to interact within the target virtual space.

9. The method of claim 8, further comprising:
receiving information about an interaction performed by a target avatar among the plurality of avatars to the avatar from a server that provides the target virtual space; and
controlling the additional device based on the information about the interaction.

10. A computer-readable storage medium storing a program for executing the method of claim 1.

11. An electronic device, comprising:
a memory configured to store a program for controlling an avatar; and
a processor configured to execute the program,
wherein the processor is configured to:
generate an avatar to be associated with a user of the electronic device,
receive, from an additional device connected to the electronic device, sensing information generated based on one or more sensors in the additional device,
determine a target action of the avatar based on the sensing information, and
control the avatar to represent the target action,
wherein the determining of the target action of the avatar comprises:
determining the target action of the avatar to be an action of holding a cigarette in a hand, when the sensing information indicates the additional device is powered on;
determining the target action of the avatar to be an action of putting out or throwing out a cigarette, when the sensing information indicates the additional device is powered off,
determining an amount of inhalation based on inhalation information related to inhalation of the user through the additional device; and
determining the target action of the avatar to be an action of blowing smoke based on the amount of inhalation, when it is determined the user takes the additional device off from his or her mouth,
wherein the amount of inhalation is calculated based on an average flow velocity of an airflow according to an inhalation of the user, a cross-sectional area of a channel through which the airflow passes, and a duration of an inhalation resistance.

* * * * *